April 11, 1967
M. CLAPP
3,313,328
MULTIPURPOSE MOUNTING WHEEL
Filed April 7, 1966
2 Sheets-Sheet 1
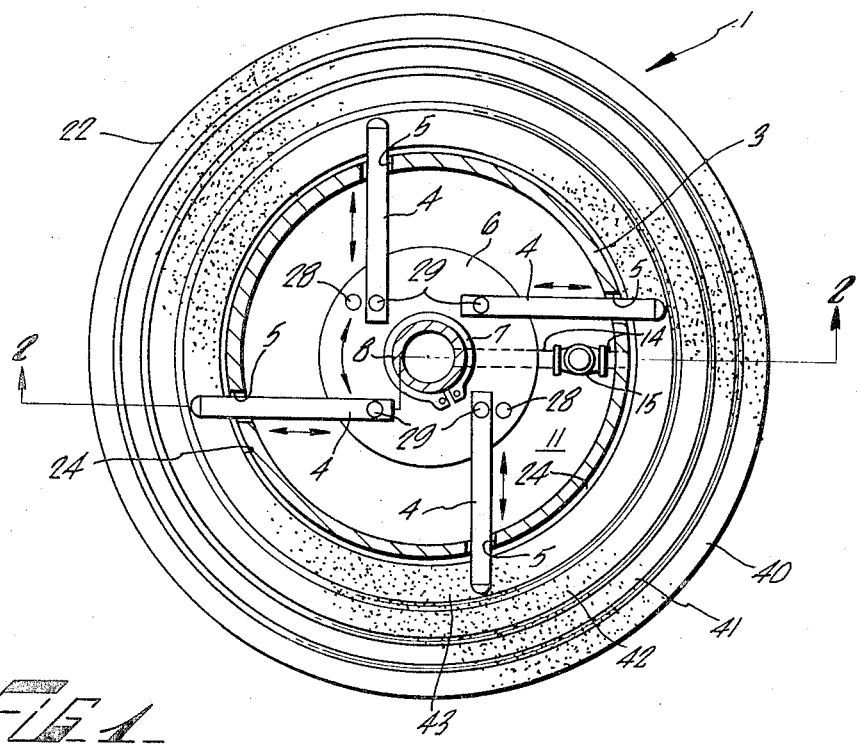
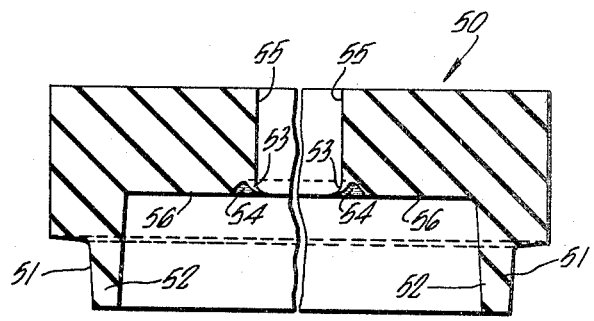
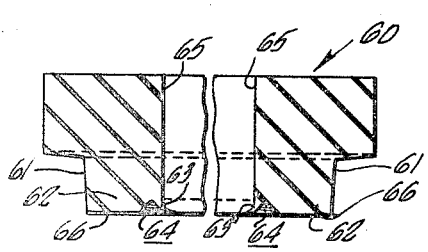
INVENTOR.
MAURICE CLAPP
BY
Christie, Parker & Hale
ATTORNEYS.

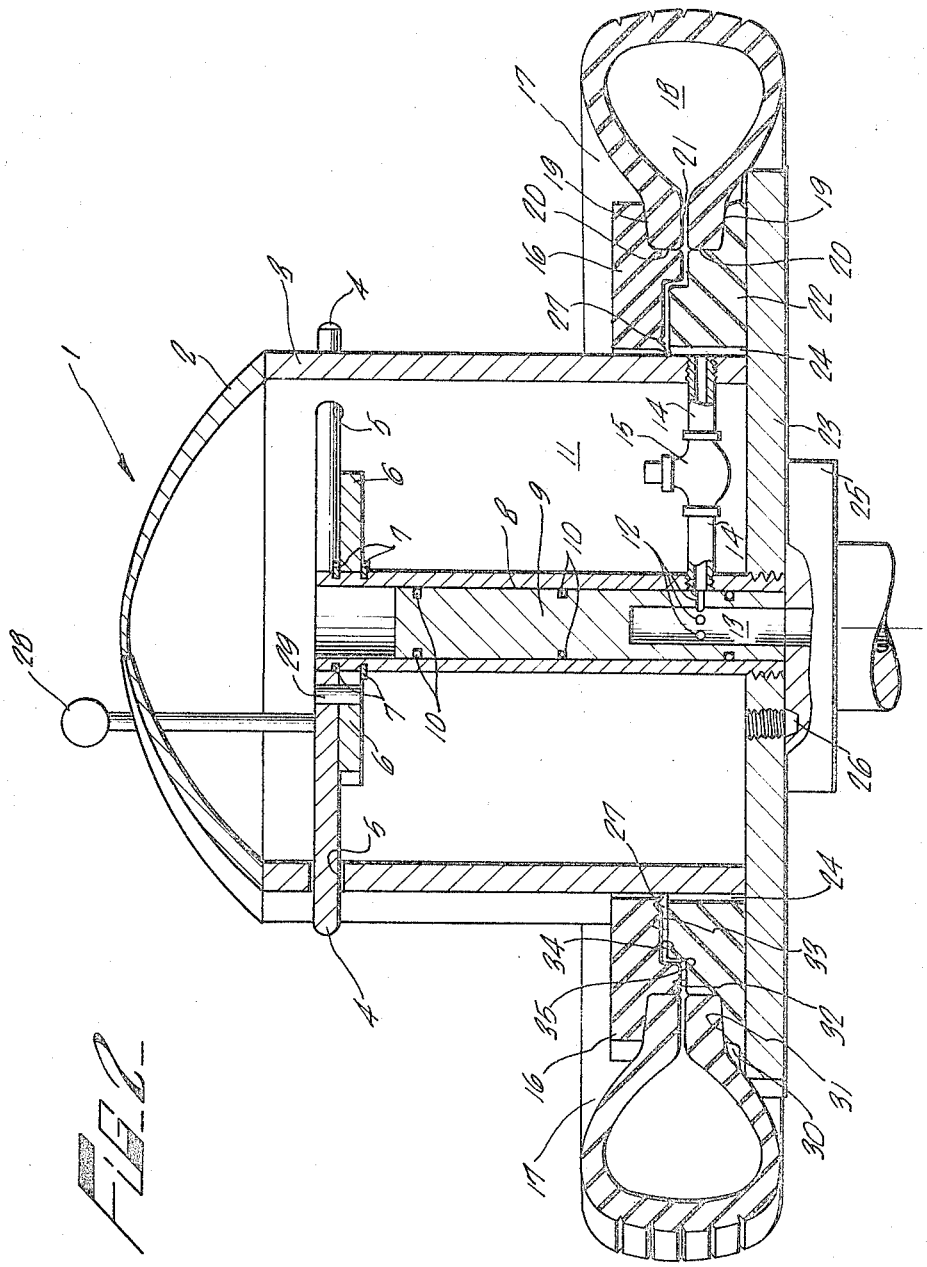

United States Patent Office 3,313,328
Patented Apr. 11, 1967

3,313,328
MULTIPURPOSE MOUNTING WHEEL
Maurice Clapp, 325 E. Cypress Ave.,
Redlands, Calif. 92373
Filed Apr. 7, 1966, Ser. No. 540,929
10 Claims. (Cl. 144—288)

This invention relates to the art of tire refurbishing and alteration and in particular to a multipurpose mounting wheel capable of mounting, at different times, different sized tires.

In the art of tire refurbishing and alteration, many operations are performed which require a mounting wheel. Tires are mounted and inflated on these wheels and the wheel driven by a power source to present the tire to a working tool. Tire refurbishing and repairing includes preparing a worn tire for retreading and recapping, as well as sidewall alteration or fabrication. Examples of the latter include conversion of white sidewall tires to a tire having a striped or narrow white wall, and the creation of a white wall on a black wall tire.

Prior art mounting wheels have taken many forms, among which are a type designed to grasp the sole and heel of the beads of a time much in the same manner as a tire is mounted on its wheel for use on a vehicle. These tire mounting wheels employ two complementary discs mounted on a hub. Each of these discs has a plurality of steps with each step designed to conform to the sole and heel of the bead of a given size tire. Thus, for passenger car tires, the steps of each disc are designed to accommodate the beads of 13, 14 and 15 inch tires.

One of the most desirable features of a mounting wheel is the ability to collapse and bring together the beads of a tire in order to properly seat the beads within the appropriate steps of the discs. Once seated, air is introduced into the tire casing between the discs, forcing the beads apart, in preparation for the desired work. Prior art discs, however, owing to the plurality of steps in both discs, cannot bring the beads of the tires together in the larger diameter tire sizes. Another problem experienced by the prior art has arisen in inflating tires with distorted beads. The prior art discs could not, even with small diameter tires, completely squeeze distorted beads together which precluded easy inflation of the tires.

Moreover, the discs employed by the prior art are mounted on a relatively small diameter hub or axle, and, therefore, are of relatively large area. When air is introduced into the casing through the hub and between the discs, the large area of the disc combined with the air pressure results in a large force tending towards their rupture. Rupture has occurred with catastropic results often injuring or killing operating personnel.

These and other problems of prior art mounting wheels are overcome by the mounting wheel of this invention. Briefly, a mounting wheel having a relatively large diameter drum together with a first annular bead ring mounted on a base and around the drum is provided. The first annular bead ring has at least two steps progressing inwardly towards the drum. Each step is capable of conforming to the heel and sole of one bead of a given size tire. A second annular bead ring, having but one step which accommodates the heel and sole of a given size tire and capable of airtight engagement on the drum, is also provided. The second ring is shaped to be capable of cooperating with the first ring to force the beads of a tire together prior to its inflation. Different sized second annular bead rings are used in the mounting of different sizes tires. Means for introducing air into the tire casing between its beads are used in the mounting wheel of this invention.

In preferred form, the annular bead rings of this invention are fabricated from reinforced rubber, as opposed to the prior arts use of metal; for rubber provides a more effective seat for the beads of a tire. The second annular bead ring has an inwardly flaring lip or flange of rubber constituting its drum-contacting surface. This lip provides an effective air seal allowing the inner surface of the second annular bead ring to be made of slightly larger diameter than the drum for easy removal and replacement. For sealing purposes, the lip is formed of softer rubber than the body of the ring but it is integral therewith. Moreover, the larger of the second annular bead rings are provided with a flange which is capable of mating with the next size smaller step of the first annular bead ring to allow beads of the larger sized tires to be forced together. The flange, then, allows the second ring to be telescoped over a step in the first ring. Air is introduced to the casing from the drum to an annulus between the first ring and the drum. Means are also provided to retain the second annular bead ring on the drum, when air is introduced into the tire casing, between the upper surface of the first annular bead ring and the lower surface of the second annular bead ring. The retaining means preferably comprises a plurality of fingers mounted within the drum and operable to extend and retract over the upper surface of the second annular bead ring. These fingers are pivotally mounted on a plate which in turn is rotatably mounted on a hub which is coaxial with the longitudinal axis of the drum. The drum is preferably of as large a diameter as possible in order to reduce the forces produced by air pressure to a minimum. This diameter will vary with the size of tires to be accommodated by the mounting wheel of this invention, but, by way of example, for a first annular bead ring designed to accommodate a 13 inch tire, it has been found that a drum diameter of 10 inches substantially completely reduces the force acting upon the annular rings to a point where their rupture is highly improbable.

To summarize a few of the advantages inherent in the instant invention including its preferred forms, the instant mounting wheel has the capacity regardless of tire size to force the beads of a tire together before the introduction of air into the tire casing without fear of catastropic failure through the provision of a distinct second annular ring with a unitary step for each tire size and a large diameter drum. Moreover, because of the use of rubber for the annular bead rings combined with the collapsing facility for all tire sizes, the bringing together of distorted tire beads is possible. In addition, because only the lip of the second annular bead ring contacts the outside cylindrical surface of the drum to produce an air seal, these rings are readily removable by hand. Further, the retractable fingers which retain the second annular ring are unobtrusively mounted within the casing of the drum, and thus do not interefere in the mounting and work upon a tire.

These and other aspects, features and advantages of the present invention will become more apparent from the following description, appended claims and drawings, in which:

FIGURE 1 is a plan view, partly in section, of the mounting wheel of this invention with the second annular bead ring removed;

FIGURE 2 is a side elevational view, taken along lines 2—2 of FIGURE 1 but including the second annular bead ring;

FIGURE 3 is a side elevational view in section of an annular ring of this invention; and FIGURE 4 is another side view in elevation of another annular ring of this invention.

Referring now, in general, to FIGURES 1 and 2, there is seen a preferred form of the mounting wheel 1 of the instant invention. Mounted on base plate 23 is drum 3 in the form of a cylindrical shell, having an interior 11. Rotatably mounted on drum 3 is cover 2 through which extends handles 28. Handles 28 are attached to plate 6 which in turn is rotatably mounted on hollow hub 8. Hollow hub 8 is secured to the base 23 and is coaxial with the drum 3. The plate 6 is retained in position by keepers 7 preferably in the form of spring clips. Pivotally mounted at their ends on plate 6 through pins 29 are fingers 4. These fingers extend through apertures 5 in the drum 3 and are capable of extending and retracting laterally of the drum 3. In their retracted position the fingers 4 do not protrude from the outside surface of the drum 3, thus allowing for the clearance of second annular bead ring 16. Second annular bead ring 16 is mounted in airtight relationship with the outside surface of the cylindrical drum 3 through the provision of a normally inwardly-flaring flange or lip 27 integral with the annular bead ring 16 but preferably formed of softer rubber. Otherwise, the annular bead ring 16 does not contact the drum 3. The annular bead ring 16 has a step 35 which rebounds an annular flange which mates with step 32 of first annular bead ring 22 as shown. The interior surfaces of the step 35 contact the heel 19 and sole 20 of a tire 17. The surfaces of step 31 of annular bead ring 22, similarly, contact the heel and sole of the other bead of tire 17. The first annular bead ring 22 has an additional step 30, as well as steps 31 and 32, to accommodate a tire of larger bead diameter than the tire shown in FIGURE 2. In addition to its mating function described, step 32 accommodates a tire of smaller bead diameter than that illustrated in FIGURE 2.

In preferred form, the annular bead ring 22 is disposed relative to the drum 3 to define an annulus 24. Opening into the annulus 24 is air supply pipe 14 which is serially connected to T 15, which has a rupture or blow-out disc for purposes of safety. Air is supplied to pipe 14 through one of the plurality of holes 12 in mandrel 9, and through the cavity 13 which extends through flange 25 for communication with a source of compressed air (not shown). The mandrel 9 together with the flange 25 is part of the prior art and, therefore, forms no part of this invention. However, for purposes of completeness, mandrel 9 is airtightly inserted within hub 8, the air seal being effected by O-rings 10. Dog 26 prevents the flange 25 and mandrel 9 from rotating with respect to the mounting wheel 1.

FIGURES 1 and 2 show a three-step first annular bead ring 22 and an intermediate sized second annular bead ring 16. The latter ring, for purposes of illustration, will accommodate a 14 inch tire. FIGURES 3 and 4 show secondary annular rings which can be used for a 15 or 13 inch tire, respectively. It should be understood, however, that the recitation of ring sizes is solely for the purpose of illustration and not by way of limitation.

With specific reference to FIGURE 3, there is seen an annular bead ring 50 preferably composed of reinforced rubber with its inner surface 55 having a diameter slightly larger than and adapted to fit around the outer surface of the drum 3. At the lower end of the surface 55 is lip 53, bounded on one side by annular groove 54. This lip, when out of contact with the drum 3, extends slightly inwardly towards the center of the ring 50 and is formed of rubber softer than its parent ring. Thus, the lip 54 forms the air seal between the drum 3 and the annular ring 50. The lower surface 56 of the ring 50 is designed to face the upper surface 33 of the first annular ring 22, shown in FIGURE 2. The annular flange 52 which bounds one side of the step 51 will, when the beads of tire 17 are collapsed, mate in step 31 of the first annular ring 22. Thus, the annular ring shown in FIGURE 3, except for diametrical dimensions, is the same as the annular ring 16 shown in FIGURE 2, performing its same functions in the same manner.

The annular ring 60 shown in FIGURE 4 is specifically designed for the smallest tire to be mounted on the mounting wheel. Because it is the smallest of the second annular bead rings, there is no flange for mating in a groove of the first annular bead ring for the purpose of allowing the beads of a tire to be forced together. Thus, the inner surface 65 extends the entire depth of the annular ring 60, as opposed to the termination of the inner surfaces of the annular rings illustrated in FIGURES 2 and 3. Sealing of the annular bead ring 60 with the drum 3 is accomplished in the same manner as with the two previously described rings. Thus, at the lower end of the inner surface 65 is a normally inwardly flaring lip 63 bounded by groove 64. The flange 62 which forms a part of the step 61 has a lower surface 66 which in position faces up to surface 33 of annular ring 22 shown in FIGURE 2. The step 61 conforms to the shape of one bead of, for example, a 13 inch tire, and complements step 32 of annular ring 22.

The operation of the mounting wheel 1 will now be described with reference to FIGURE 2. The lower bead of tire 17 is engaged in step 31, its heel 19 and sole 20 conforming to the surface of the step. The second annular ring 16 is inserted over the drum 3, with fingers 4 retracted. The ring 16 is forced into engagement with the upper bead of tire 17 such that the sole 20 and the heel 19 conform to the surface of the step of ring 16. The ring 16 is forced downwardly until the toes 21 of the tire 17 are compressed together. This forces the heel and sole of the beads into substantially complete conformity with the steps in the annular rings 16 and 22. Handles 28 are then rotated to extend fingers 4 by rotating plate 6 about hub 8. In the configuration shown, top 2 will rotate with plate 6 and handle 28. Air of the desired pressure is then admitted into cavity 13 through one of the holes 12 and into pipe 14, through annulus 24, and between upper surface 33 of the annular bead ring 22, and the lower surface 34 of the annular bead ring 16. Because the collapsed toes of the tire 17 do not form a perfect seal, air will be admitted into the interior 18 of the tire 17, whereupon the beads of the tire 17 separate into more or less their normal configuration forcing the second annular bead ring 16 upwardly on the drum 3. Fingers 4 are extended before air is admitted into interior 18 and, therefore, they are capable of bearing against the upper surface of bead ring 16 to retain the latter on drum 3. Work of the desired nature can then be commenced.

The annular bead rings of this invention are designed to produce a seal along substantially the entire periphery of the tire beads which they seat. That is, the sole and heel of each tire bead is in contact with the surface of the step of the annular bead ring in which they are mounted. This feature not only provides a more positive seat and air seal, but compensates for any bead distortion. Thus, even though the beads of a tire would not conform to their normal seating arrangement because of distortion, on the rim of an automotive wheel, for example, they will seat on the annular bead rings of this invention.

The foregoing description has described a preferred embodiment of the instant invention. It is not intended, however, that the following appended claims be limited in their scope or spirit to this description.

What is claimed is:

1. A multipurpose mounting wheel for mounting, at different times, different sized tires having a casing and two beads, each bead having a sole, a heel and a toe; said mounting wheel comprising:

(a) a base;
  (b) a cylindrical drum mounted on said base having a relatively large diameter;
  (c) a first annular bead ring mounted on said base around said drum having an outer periphery defining at least two steps of different diameters progressing from the largest diameter step upwardly and inwardly towards said hub, each step sized to at least substantially conform to the sole and heel of one bead of a tire;
  (d) a second annular bead ring being capable of disposition in airtight relation to the outer cylindrical surface of said drum and having one step complementing one of the steps in said first annular ring such that it conforms to the sole and heel of the second bead of a tire having its first bead's sole and heel in the complementary step of said first annular ring, said second annular ring being shaped such that it is capable of forcing the toes of the beads of the tire together; and (e) means for introducing air under pressure into said casing.

2. The multipurpose mounting wheel claimed in claim 1, wherein said first and second annular rings are composed of reinforced rubber and the capacity for airtight relationship with the surface of said drum is provided by a lip normally flaring inwardly towards the center of and integral with said second annular ring.

3. The multipurpose mounting wheel claimed in claim 2, having an annulus between said first annular ring and the outer cylindrical surface of said drum and wherein said means for introducing air includes the annulus.

4. The multipurpose mounting wheel claimed in claim 3, wherein said second annular bead ring has its complementary step of a diameter larger than at least one of the steps in said first annular bead ring and includes an annular flange capable of mating in the step of said first annular ring next smaller in size than the complementary steps of said first and second annular bead rings.

5. The multipurpose mounting wheel claimed in claim 1, including as an additional element means for retaining said second annular bear ring on said drum when air is introduced into said casing.

6. The multipurpose mounting wheel claimed in claim 5, wherein said second annular bead ring-retaining means includes a plurality of fingers mounted in said drum and operable to extend a portion thereof laterally outwardly of said drum over said second annular bead ring and to retract within said drum.

7. The multipurpose mounting wheel claimed in claim 6, wherein said drum comprises a hollow cylindrical shell and including:

(a) a hollow hub mounted on said base inside and coaxial with said drum, said hub adapted to receive a driving mandrel and having at least one aperture through its wall which is included in said air introduction means;

(b) a plate rotatably and coaxially mounted on said hub and wherein;

(c) said fingers are pivotally mounted on said plate; and (d) means are associated with said plate to rotate it back and forth to extend and retract said fingers.

8. The multipurpose mounting wheel claimed in claim 7 wherein said first and second annular rings are composed of reinforced rubber and the capacity for airtight relationship with the surface of said drum is provided by a lip normally flaring inwardly towards the center of and integral with said second annular ring.

9. The multipurpose mounting wheel claimed in claim 8, having an annulus between said first annular ring and the outer cylindrical surface of said drum and wherein said means for introducing air includes at least one port opening into said annulus.

10. The multipurpose mounting wheel claimed in claim 3, wherein said second annular bead ring has its complementary step of a diameter larger than at least one of the steps in said first annular bead ring and includes an annular flange capable of mating in the step of said first annular ring next smaller in size than the complementary steps of said first and second annular bead rings.

References Cited by the Examiner

UNITED STATES PATENTS

| | | | |
|---|---|---|---|
| 1,352,722 | 9/1920 | Caldwell | 157—1.2 |
| 2,607,403 | 8/1952 | Patterson | 157—1.24 |
| 2,614,603 | 10/1952 | Howley | 152—404 |
| 2,973,791 | 3/1961 | French | 144—288 |
| 3,195,179 | 7/1965 | Laube | 144—288 |
| 3,238,982 | 3/1966 | Dair | 144—288 |

FOREIGN PATENTS 1,008,536    5/1957    Germany.

WILLIAM W. DYER, Jr., *Primary Examiner.*

R. J. ZLOTNIK, *Assistant Examiner.*